(12) United States Patent
Kerwin (10) Patent No.: US 11,298,977 B2
(45) Date of Patent: Apr. 12, 2022

(54) ROBOTIC WHEEL GRIPPER WITH A TPM SENSOR

(71) Applicant: INTERNATIONAL WHEEL & TIRE COMPANY, Farmington Hills, MI (US)

(72) Inventor: Kevin R. Kerwin, Orion Township, MI (US)

(73) Assignee: INTERNATIONAL WHEEL & TIRE COMPANY, Farmington Hills, MI (US)

(*) Notice: Subject to any disclaimer, the term of this patent is extended or adjusted under 35 U.S.C. 154(b) by 0 days.

(21) Appl. No.: 16/908,119

(22) Filed: Jun. 22, 2020

(65) Prior Publication Data

US 2020/0316989 A1    Oct. 8, 2020

Related U.S. Application Data

(63) Continuation of application No. 15/323,516, filed as application No. PCT/US2015/038575 on Jun. 30, 2015, now Pat. No. 10,710,402.

(60) Provisional application No. 62/019,536, filed on Jul. 1, 2014.

(51) Int. Cl.
| | |
|---|---|
| *B60B 30/06* | (2006.01) |
| *B25J 15/02* | (2006.01) |
| *B25J 15/10* | (2006.01) |
| *B25J 9/00* | (2006.01) |
| *B25J 19/02* | (2006.01) |
| *B60C 23/04* | (2006.01) |

(52) U.S. Cl.
CPC ............ *B60B 30/06* (2013.01); *B25J 9/0093* (2013.01); *B25J 15/0253* (2013.01); *B25J 15/10* (2013.01); *B25J 19/021* (2013.01); *B60C 23/04* (2013.01)

(58) Field of Classification Search
CPC ...... B25J 9/0093; B25J 15/0253; B25J 15/10; B25J 19/021; B25J 19/023; B60B 30/06; B60C 23/00; B60C 23/02; B60C 23/04; B60C 25/0515; B60C 25/0554; B60C 25/18; B60C 25/185
USPC ......................................................... 414/732
See application file for complete search history.

(56) References Cited

U.S. PATENT DOCUMENTS

| | | |
|---|---|---|
| 5,219,264 A | 6/1993 | McClure et al. |
| 8,573,918 B2 | 11/2013 | Lawson et al. |
| 8,613,303 B1 | 12/2013 | Hanneken et al. |
| 2007/0000616 A1 | 1/2007 | Rogalla et al. |
| 2007/0107183 A1 | 5/2007 | Lawson et al. |
| 2010/0051206 A1 | 3/2010 | Lawson |

(Continued)

FOREIGN PATENT DOCUMENTS

WO    2012005866 A2    1/2012

*Primary Examiner* — Saul Rodriguez
*Assistant Examiner* — Brendan P Tighe
(74) *Attorney, Agent, or Firm* — Brooks Kushman, P.C.

(57) ABSTRACT

A robotic wheel gripper unit that is configured for gripping and transporting a wheel to a predetermined position during an assembly operation with a tire is disclosed. The robotic wheel gripper unit comprises a selectively moveable arm that includes a gripper tool connected thereto. The gripper tool further includes a plurality of gripper fingers and at least one sensor. The gripper fingers are configured for selectively engaging a portion of a wheel. The sensor is configured to detect a predetermined element on the wheel, such as a TPMS valve stem, to assist in placement of the wheel during an assembly operation.

19 Claims, 12 Drawing Sheets

(56) References Cited

U.S. PATENT DOCUMENTS

| | | | | |
|---|---|---|---|---|
| 2011/0284170 A1* | 11/2011 | Lemser | ................ | B60C 25/138 |
| | | | | 157/1.1 |
| 2012/0073764 A1* | 3/2012 | Lawson | ................ | G01M 1/326 |
| | | | | 157/1.1 |
| 2019/0389258 A1* | 12/2019 | Wen | .................... | B60C 25/0548 |

* cited by examiner

ROBOTIC WHEEL GRIPPER WITH A TPM SENSOR

CROSS-REFERENCE TO RELATED APPLICATION

This application is a continuation of U.S. application Ser. No. 15/323,516 filed Jan. 3, 2017, which is the U.S. national phase of PCT Application No. PCT/US2015/038575 filed on Jun. 30, 2015, which claims the benefit of U.S. Provisional Application Ser. No. 62/019,536 filed on Jul. 1, 2014, the disclosures of which are incorporated in their entirety by reference herein.

TECHNICAL FIELD

The present disclosure relates to a robotic wheel gripper. More specifically, the present disclosure relates to a robotic wheel gripper that is configured to orient/rotate the wheel to position a tire pressure monitor sensor ("TPMS") valve stem in a predetermined position to prevent damage to the TPMS valve stem during an assembly operation where the tire is mounted to the wheel.

BACKGROUND

In one exemplary automated tire/wheel assembly system, wheels are transported via a first conveyor system, while the tires are delivered via a second conveyor system. An assembly conveyor is positioned between the first and second conveyor systems. A wheel load robot is configured to grip a wheel and move it to an assembly conveyor, while a tire load robot grips a tire and moves it to the assembly conveyor, so as to partially position the tire on the wheel at an angle to create a tire/wheel subassembly. The tire/wheel subassembly is then transported by the assembly conveyor to a mounting robot. The tire is then mounted on the wheel by the mounting robot so as to fully seat the tire on the wheel, prior to inflation of the tire.

However, one issue that remains problematic in such an automated assembly is that current wheels include valve stem TPM sensors that need to be positioned at a certain angle to properly mate with the tire, without damage the TPM sensors during the assembly operation. Indeed, the degree of precision required in locating the TPM valve stem sensor during assembly of the wheel/tire assembly is problematic because threads of the TPM valve stem can be irreparably damaged during assembly. Accordingly, what is needed is a system that can locate the TPM valve stem and position the wheel on the assembly conveyor so as to properly place the wheel on the tire before the wheel is fully seated so as to prevent damage to the TPM valve stem.

SUMMARY

A robotic wheel gripper unit that is configured for gripping and transporting a wheel to a predetermined position during an assembly operation with a tire is disclosed. In one exemplary arrangement, the robotic wheel gripper unit comprises a selectively moveable arm that includes a gripper tool connected thereto. The gripper tool further includes a plurality of gripper fingers and at least one sensor. The gripper fingers are configured for selectively engaging a portion of a wheel. The sensor is configured to detect a predetermined element on the wheel, such as a TPMS valve stem, to assist in placement of the wheel at a predetermined position during an assembly operation to prevent damage of the wheel element during an assembly operation of mounting a tire to the wheel.

In one exemplary arrangement, the gripper fingers are carried on platforms that are selectively moveable from a releasing position to a gripping position. When the gripper fingers are in the releasing position, the gripper fingers are moved laterally away from the wheel. The gripper fingers may include grooves that are configured to engage with the portion of the wheel when the gripper fingers are in the gripping position.

In one exemplary arrangement, the gripper tool includes two pairs of gripper fingers, with each pair being carried on a common platform. The sensor may be mounted to one of the platforms. For example, in one arrangement, the sensor is mounted to a sensor plate that extends from one of the platforms that carry the gripper fingers.

In one exemplary arrangement the sensor is an optical sensor. The sensor is operatively connected to a controller that records the position of the tire pressure monitor system valve stem with respect to a fixed position such that the gripper tool may position the wheel on an assembly conveyor in a predetermined position to locate the tire pressure monitor system valve stem at a predetermined orientation during an assembly operation with a tire.

A method of operating a robotic wheel gripper unit is also disclosed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1-12, a robotic wheel gripper 10 that is configured for gripping a wheel 12 so as to properly load the wheel 12 on an assembly conveyor is disclosed. The robotic wheel gripper 10 is operable such that a TPMS valve stem 14 may be oriented at a predetermined position during assembly with a tire during the assembly process. In this manner, the TPMS valve stem 14 will not be damaged when the tire is assembled to the wheel 12. The robotic wheel gripper 10 may include at least one articulated joint 16 and a wrist 18. An arm 19 is positioned between the joint 16 and the wrist 18. The robotic wheel gripper 10 is capable of movement with at least three degrees of freedom along one of a selectable plurality of programmable predetermined paths. A gripper tool 20 is mounted to the wrist 18 of the robotic wheel gripper 10.

The joint 16 is mounted to a body portion 22 that is connected to a base portion 24. In one exemplary arrangement, the body portion 22 is rotatably-connected to the base portion 24 such that the body portion 22 may be pivoted relative to the base portion 24. Further, the body portion 22 may be hinged to the base portion such that the body portion 22 may be articulated vertically relative to the base portion 24.

In one exemplary embodiment, the arm 19 may be connected to the body portion 22 such that the arm 19 may be articulated in any desirable upward or downward position relative the body portion 22. Similar to the rotatable connection of the base portion 24 and body portion 22, the gripper tool 20 may be rotatably-connected to the arm 19 such that the gripper tool 20 may be rotated, pivoted or otherwise spun 360° relative the arm 19; as will be described in further detail below.

The gripper tool 20 includes a plurality of gripper fingers 26. Each gripper finger 26 further comprises a grip groove 28 that is configured for selectively engaging an upper flange 30 of the wheel 12 (best seen in FIGS. 2-3). In one exemplary arrangement, the gripper tool 20 includes 4 gripper fingers 26, with the gripper fingers 26 arranged in opposing pairs. The gripper tool 20 also comprises at least one sensor 31 that is configured to locate the TPMS valve stem 14. In one exemplary arrangement, the sensor 31 is an optical sensor such as an LED sensor. However, other sensors are contemplated.

Figure 8:
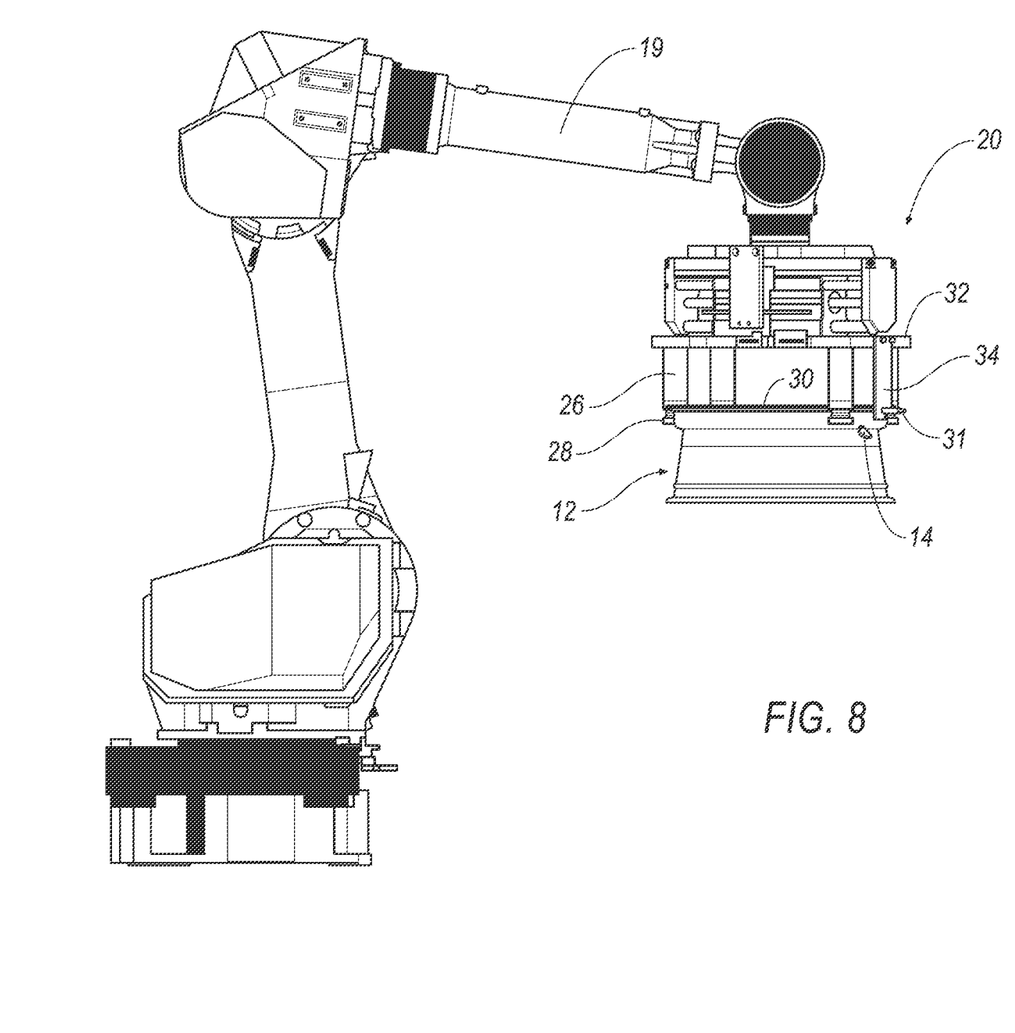
FIG. 8 is a first side elevational view of the robotic wheel gripper of FIG. 1, in the gripping position.

The gripper fingers 26 may be carried on platforms 32 that are selectively moveable from a releasing position (i.e., FIG. 2) to a gripping position (i.e., FIG. 8). In the releasing position, the opposing gripper fingers 26 are moved away from one another. In the gripping position, the opposing gripper fingers 26 are moved toward one another, to a distance that is approximately the width of the wheel 12. The sensor 31 may be mounted on a separate sensor plate 34 that is connected to one of the platforms 32, so as to be positioned between one of the pairs of the gripper fingers 26. With this configuration, the sensor 31 will move with the gripper fingers 26.

Figure 1:
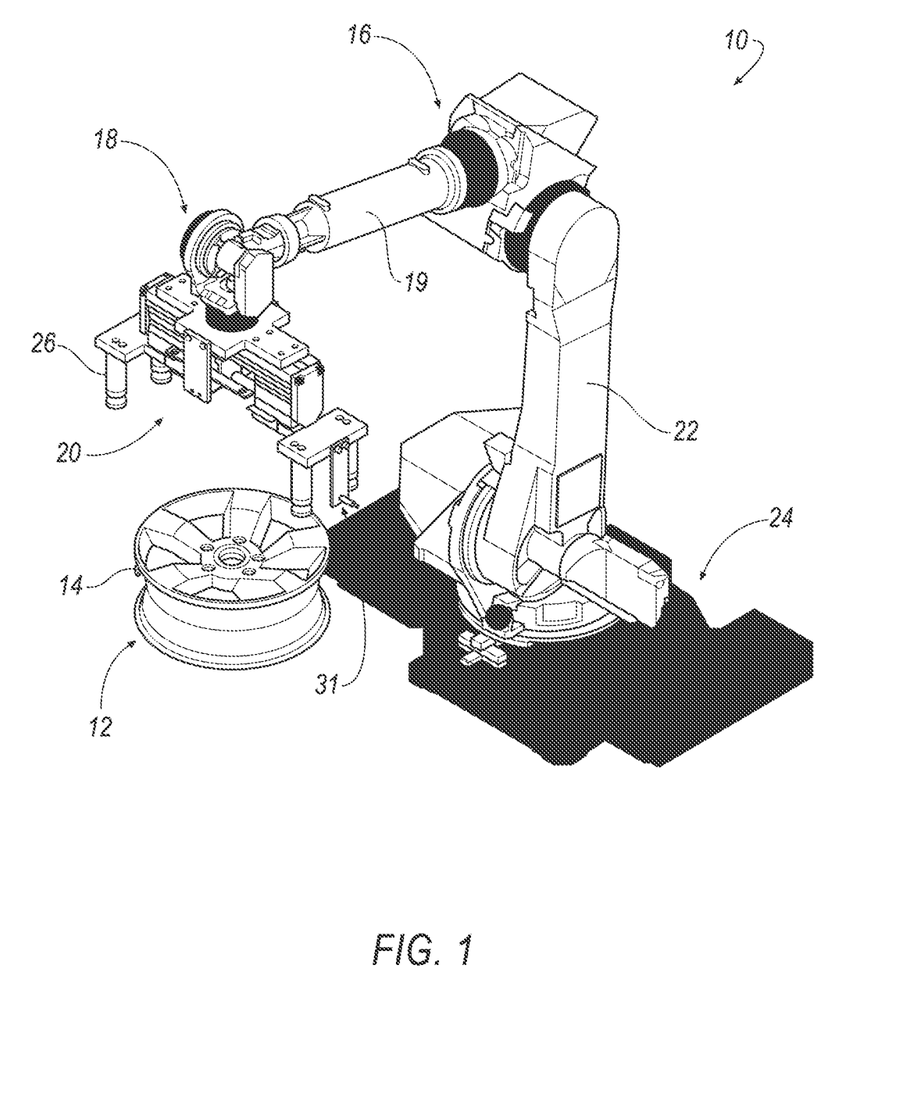
FIG. 1 is a perspective view of a robotic wheel gripper in an initial position.
Figure 2:
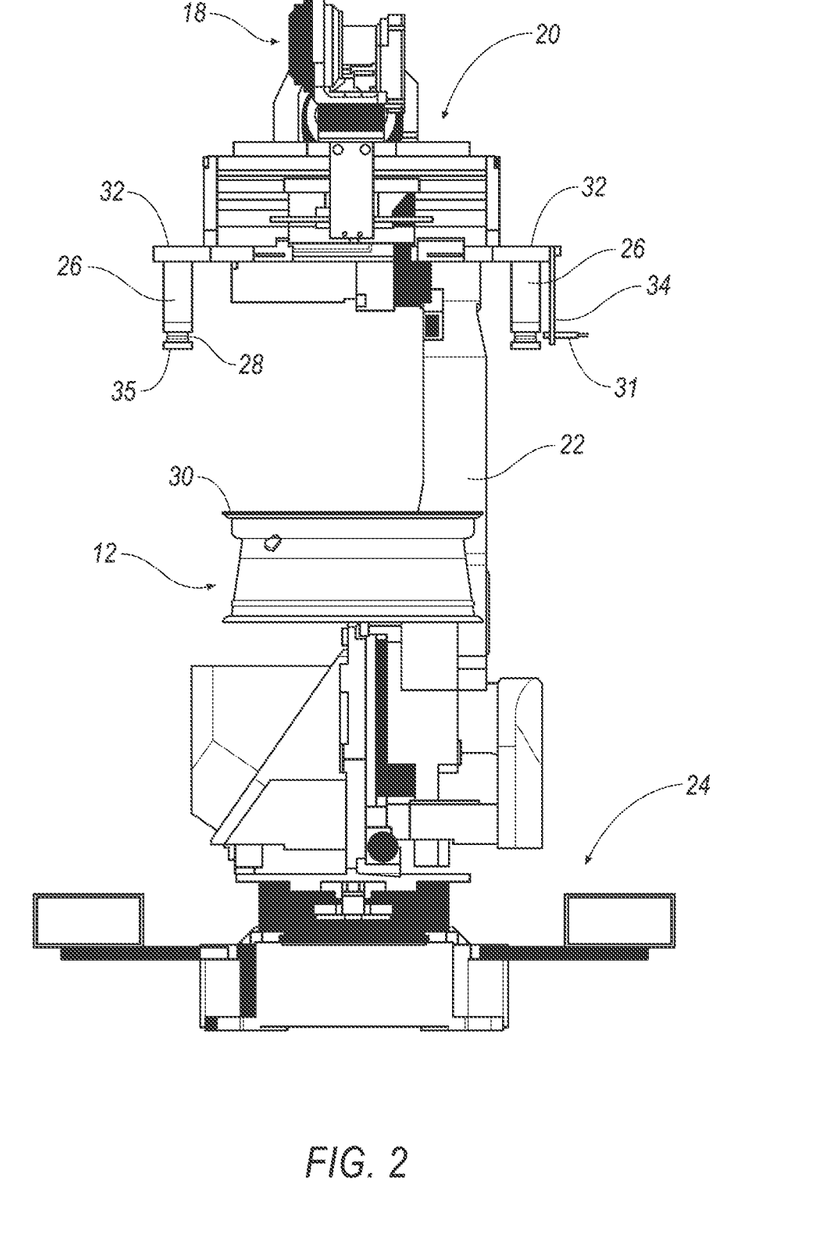
FIG. 2 is a front elevational view of the robotic wheel gripper of FIG. 1 in the initial position.
Figure 3:
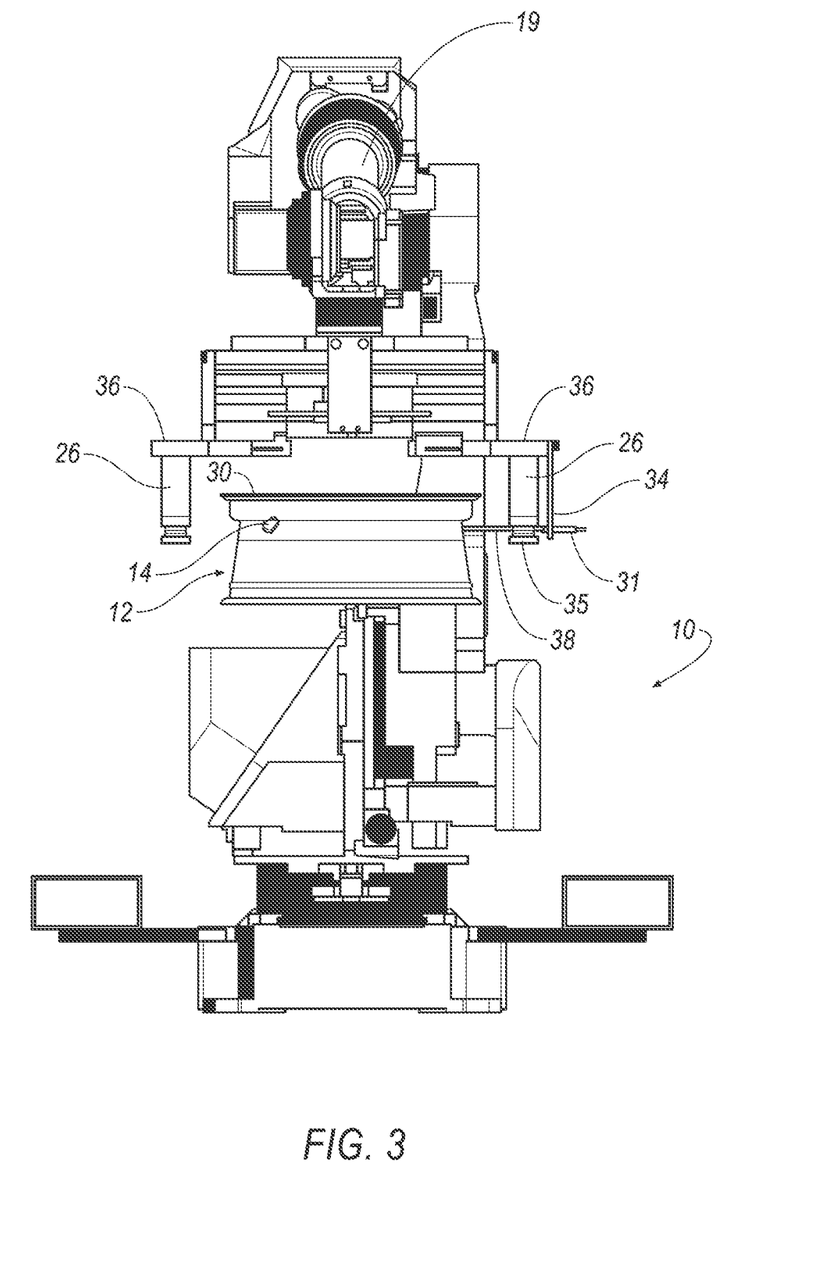
FIG. 3 is a front elevational view of the robotic wheel gripper of FIG. 1 in a scan position.
Figure 12:
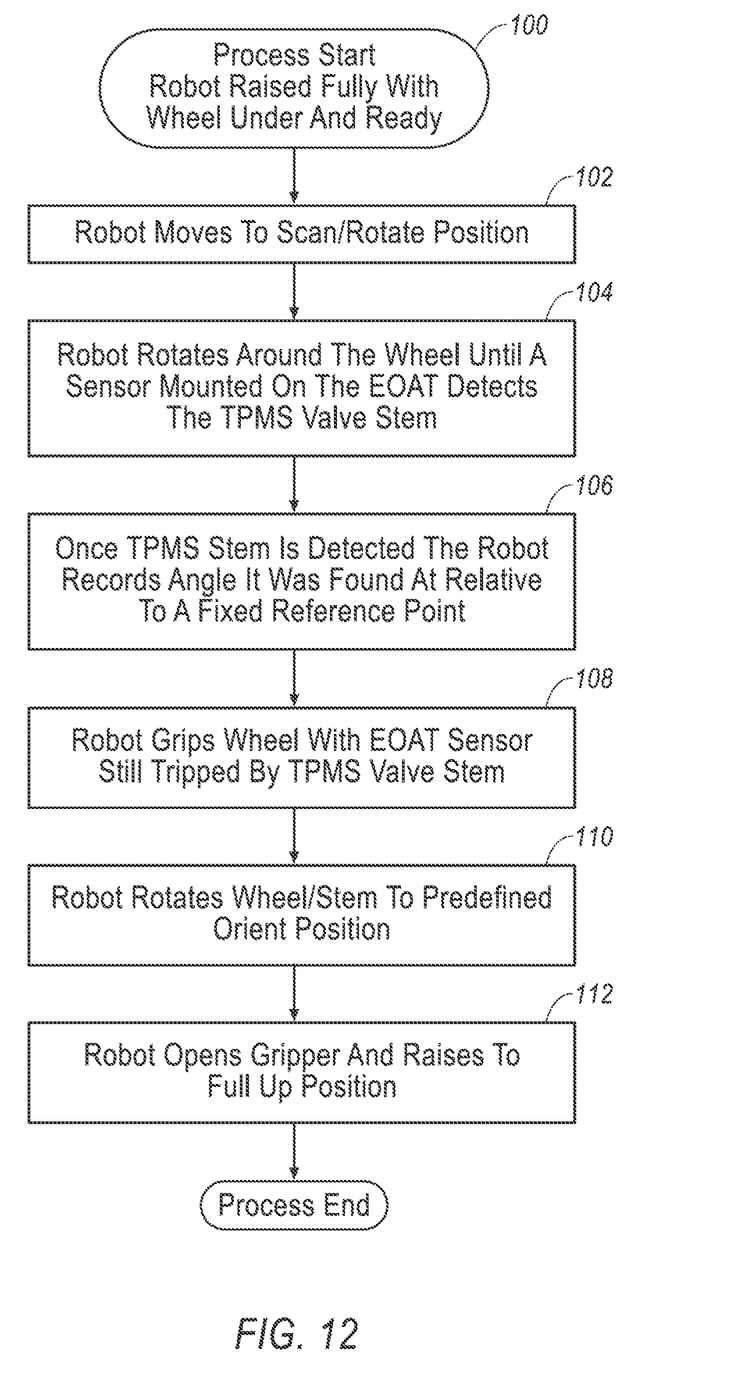
FIG. 12 is a flow chart illustrating the operation of the robotic wheel gripper.

The operation of the robotic wheel gripper 10 will not be described in connection with the flow chart in FIG. 12, as well as FIGS. 1-11. More specifically, in an initial step 100, the wheel 12 is initially positioned on wheel conveyor system (not shown) or platform (not shown) in a known, conventional manner. The robotic wheel gripper 10 has the arm 19 that is carrying the gripper tool 20 fully raised such that a bottom surface 35 of the gripper fingers 26 is positioned above the top flange 30 of the wheel 12. The gripper tool 20 is positioned, however, directly over the wheel 12 so as to be centered over the wheel 12, as shown in FIG. 2, for example.

In step 102, the gripper tool 20 is moved downward over the wheel 12 into a scanning position. More specifically, as may be seen in FIG. 3, the arm 19 is pivoted such that the gripper tool 20 is lowered. In the scanning position, the gripper fingers 26 are positioned to straddle around the wheel 12. In other words, the bottom surface 35 of the gripper fingers 26 are positioned below the top flange 30 of the wheel 12. The sensor 31 is also positioned below the top flange 30, but is configured to be located in the plane where the TPMS valve stem 14 is positioned on the wheel 12, such that a beam 38 from the sensor 31 will intersect the TPMS valve stem 14 during the scanning operation. In one exemplary configuration, the robot 10 can be programmed to lower to a certain predetermined height to ensure that the sensor 31 intersects with the TPMS valve stem 14. In step 102, the gripper fingers 26 are still in a releasing position, such that the gripper fingers 26 are not contacting the wheel 12.

Figure 4:
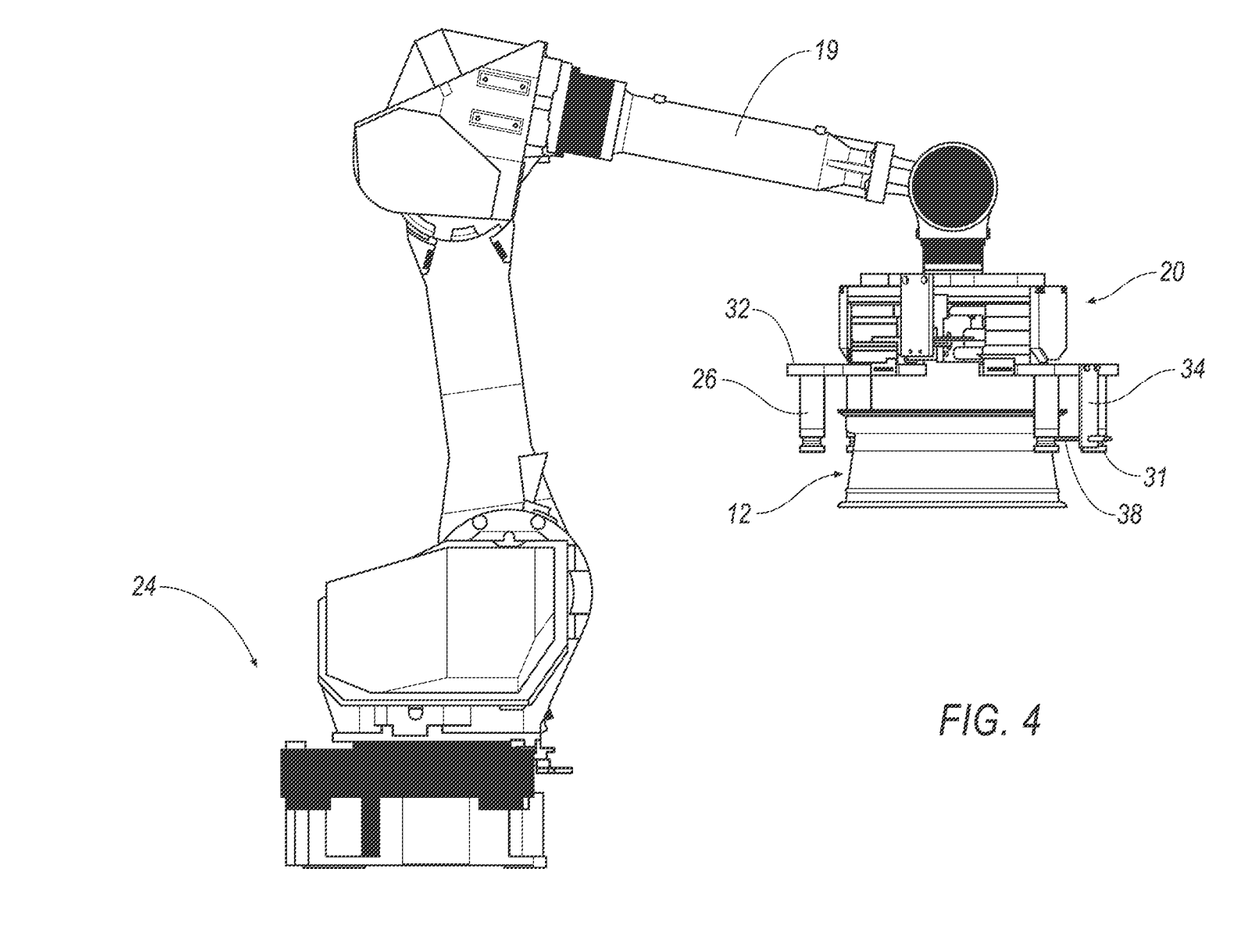
FIG. 4 is a first side elevational view of the robotic wheel gripper of FIG. 1 in the scan position, as an end effector rotates around the wheel.
Figure 5:
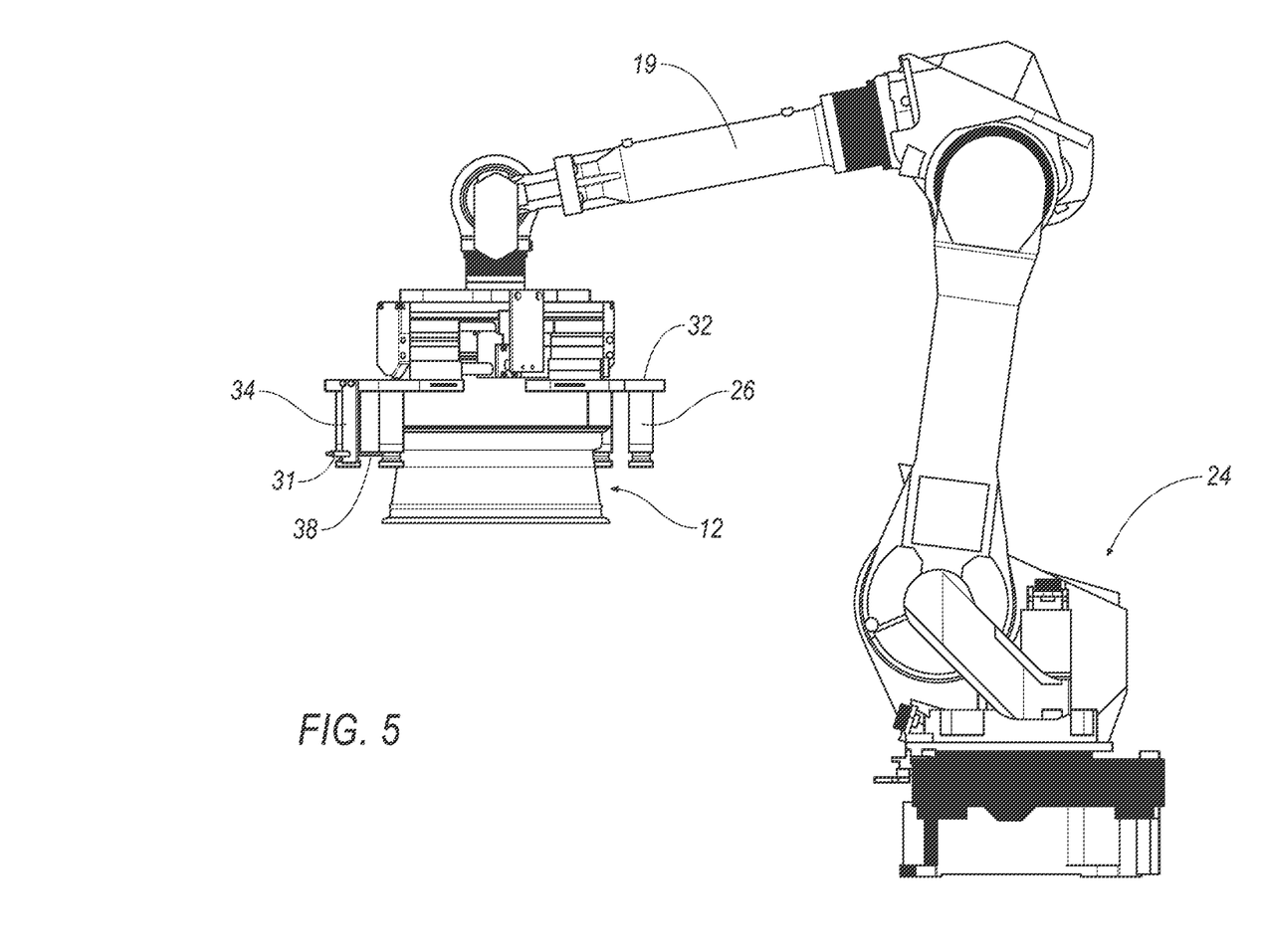
FIG. 5 is a second side elevational view of the robotic wheel gripper of FIG. 1, in the scan position, as the end effector rotates around the wheel.
Figure 6:
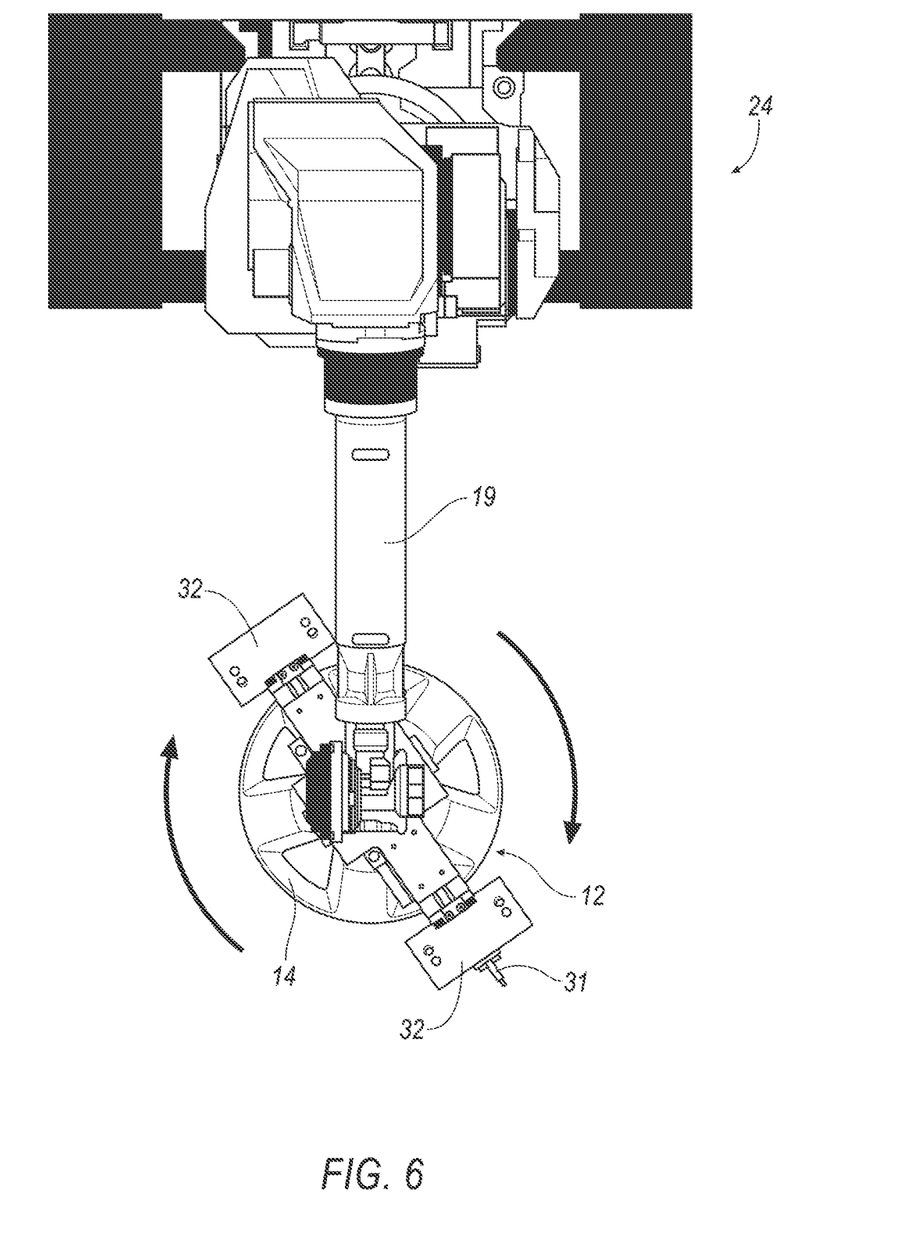
FIG. 6 is a top plan view of the robotic wheel gripper of FIG. 1, in the scan position, as the end effector rotates around the wheel.

Referring to FIGS. 4-6, once in the scanning position, in step 104, the gripper tool 20 is then operated to rotate around the wheel 12. More specifically, the gripper tool 20 rotates around the wheel 12 (as illustrated by arrows A in FIG. 6) until a beam 38 of light from the sensor 31 intersects the TPMS valve stem 14 so as to locate the TPMS valve stem 14. Once the TPMS valve stem 14 is located, the process moves on to step 106.

In step 106, the robotic wheel gripper 10 records the angle where the TPMS valve stem 14 is located relative to a fixed reference point. The process then proceeds to step 108.

Figure 7:
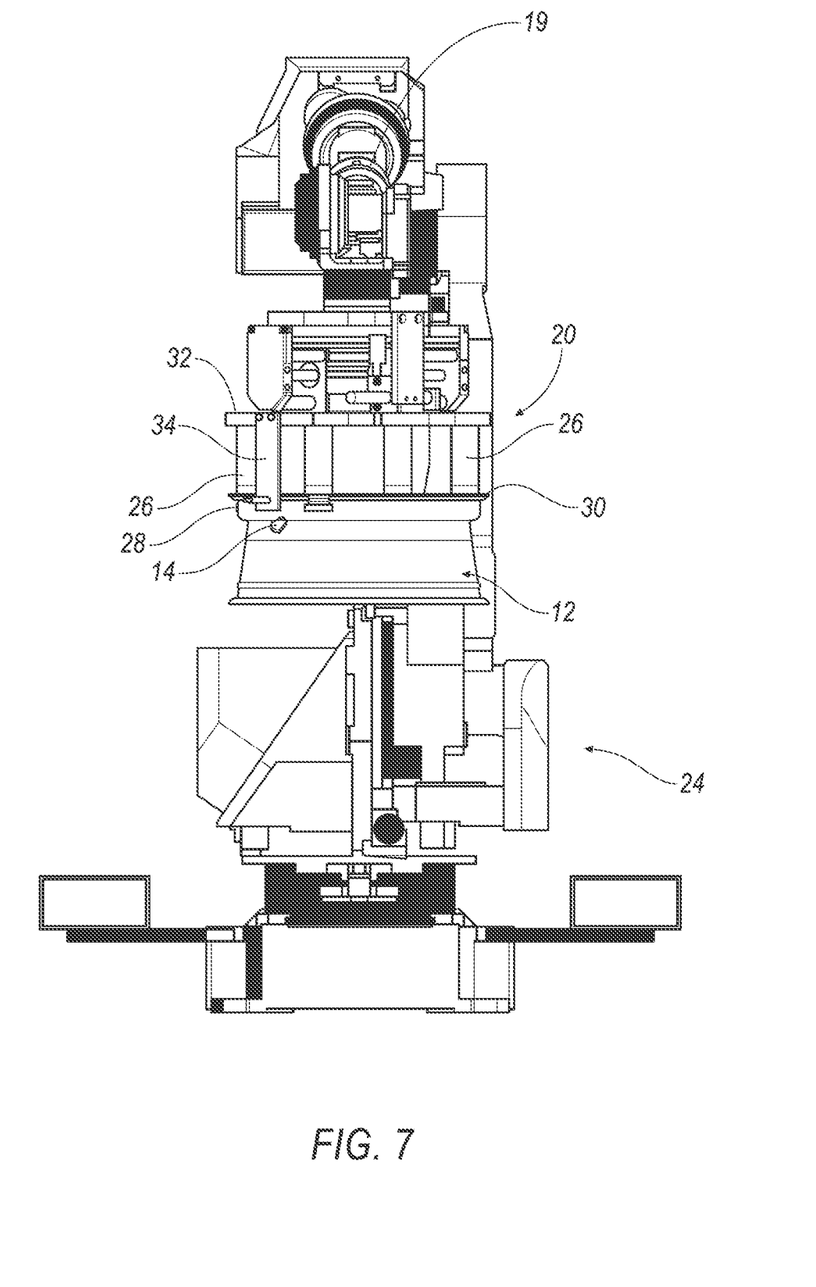
FIG. 7 is a front elevational view of the robotic wheel gripper of FIG. 1, in a gripping position.

Referring to FIGS. 7-8, in step 108, the gripper tool 20 is retracted upwardly (with respect to the wheel 12) a predetermined distance so as to align the grip grooves 28 of the gripper fingers 26 with the upper flange 30 of the wheel 12. Once positioned, the gripper fingers 26 are moved into an engagement position. More specifically, the gripper fingers 26 are moved inwardly and into contact with the upper flange 30 of the wheel 12. The process then proceeds to step 110.

Figure 9:
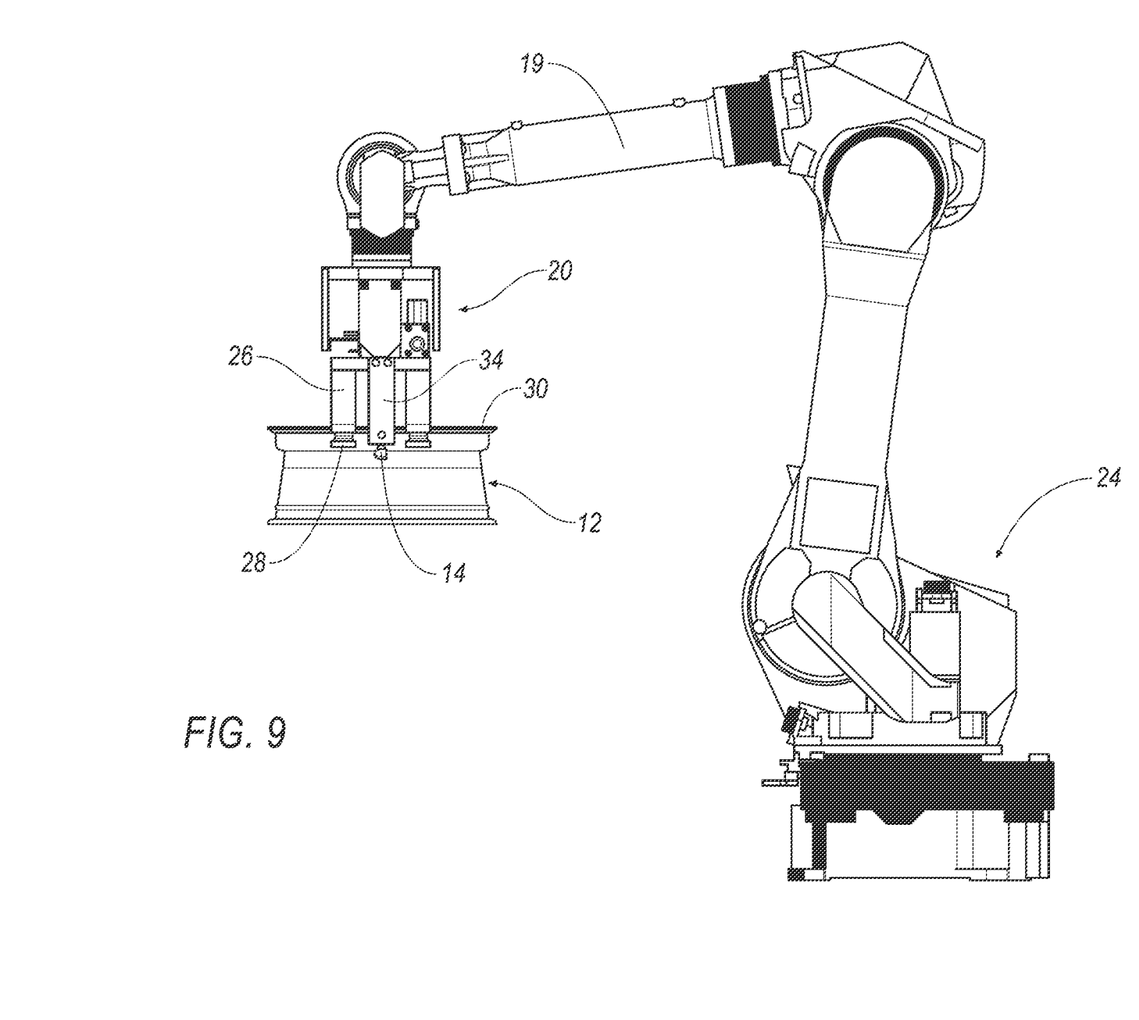
FIG. 9 is a second side elevational view of the robotic wheel gripper of FIG. 1, in the gripping position.

In step 110, referring to FIG. 9, the robotic wheel gripper 10 will rotate the wheel 12 and move the wheel 12 to orient the TPMS valve stem 14 to a predetermined position such that assembly to the tire will not lead to damage. In one exemplary arrangement, the robotic wheel gripper 10 rotates the wheel 12 while simultaneously moving the wheel 12 to the assembly conveyor. The process then proceeds to step 112.

Figure 10:
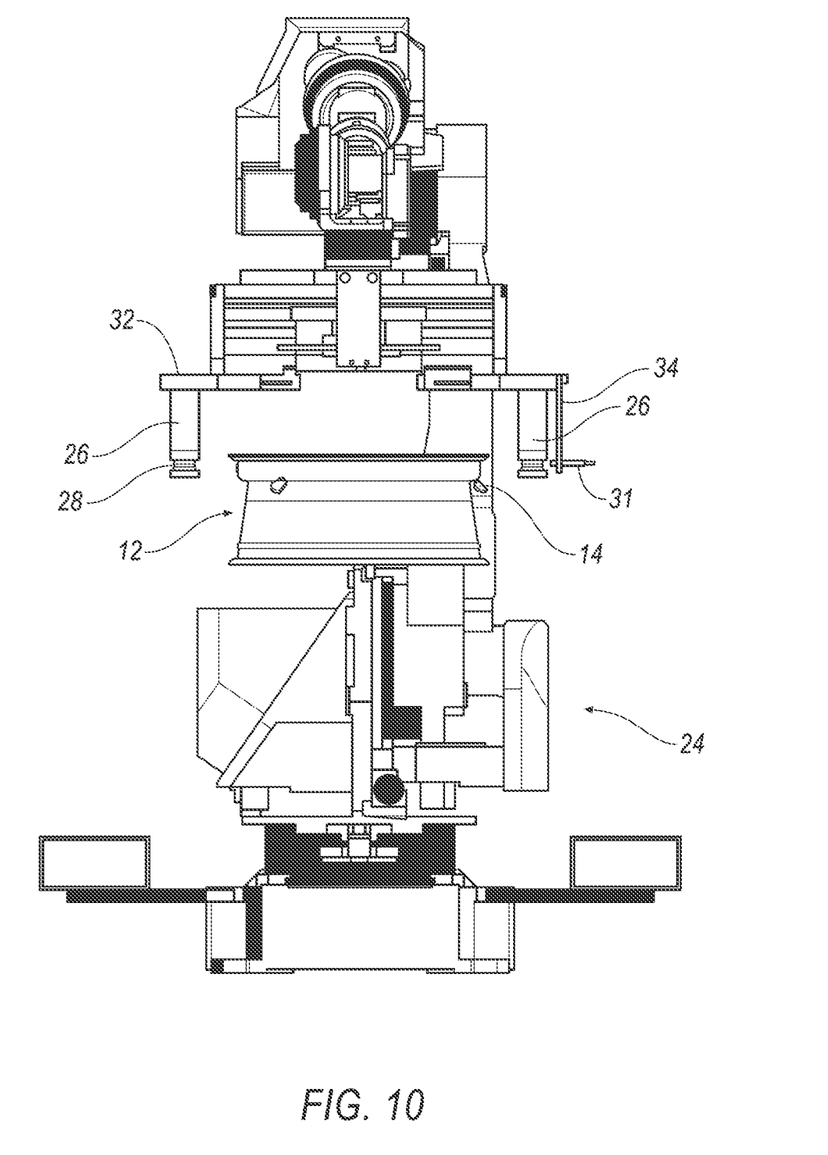
FIG. 10 is a front elevational view of the robotic wheel gripper of FIG. 1, as the robotic wheel gripper releases the wheel.
Figure 11:
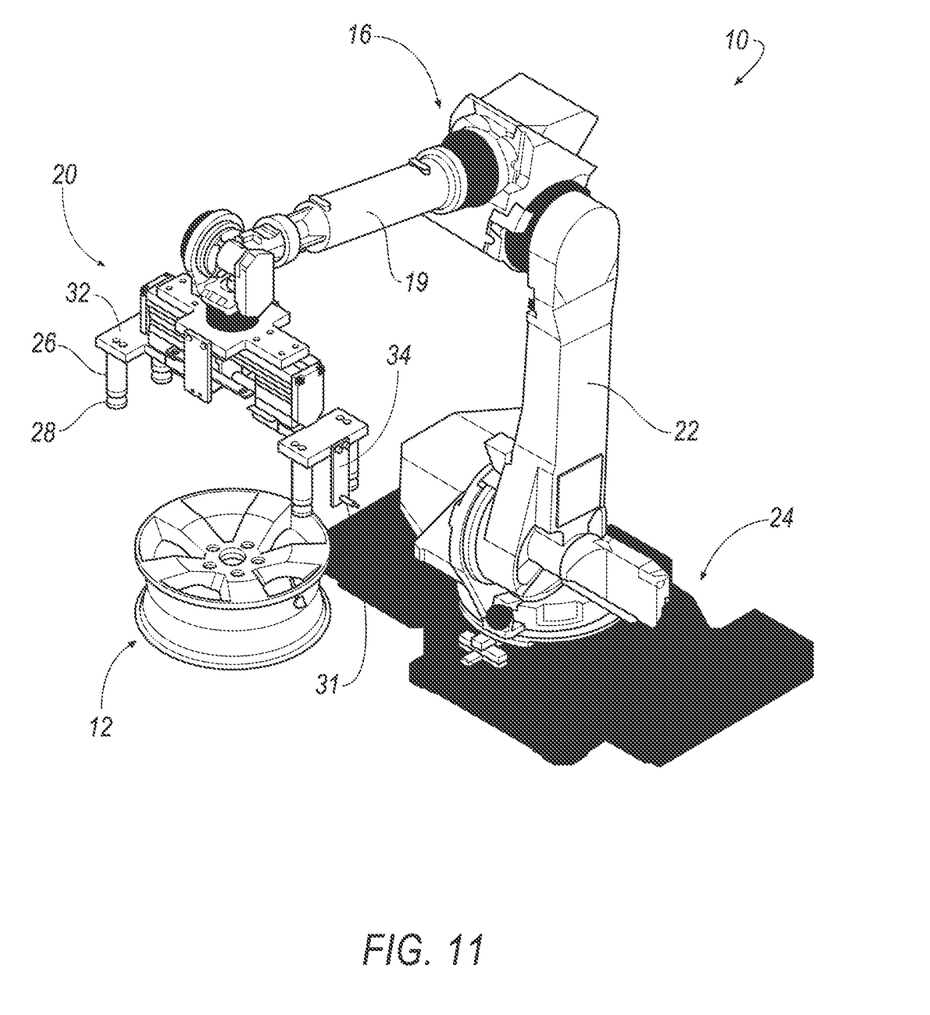
FIG. 11 is a perspective view of the robotic wheel gripper of FIG. 1, when the robotic wheel gripper retracts from the wheel.

In step 112, and referring specifically to FIG. 10, once the wheel 12 is positioned on the assembly conveyor (not shown), with the TPMS valve stem 14 oriented to a predetermined position, the gripper tool 20 moves into the releasing position. More specifically, the gripper fingers 26 are moved away from the wheel 12, so as to release the wheel from the gripper tool 20. Next, referring to FIG. 11, the arm 19 is retracted so as to lift the gripper tool 20 upward and away from wheel 12. Once the arm 19 is retracted, the robotic wheel gripper 10 will return to the wheel conveyor (not shown) and is positioned over another wheel 12 to begin the process again.

It is understood that the robotic wheel gripper 10 may be automatically operated by a controller (not shown) that is configured to lift and move wheel 12 at predetermined time intervals, including coordinating with other robots to producing an automated wheel/tire assembly and inflation system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of locating a tire pressure monitor system valve stem during a wheel assembly operation, comprising:
   positioning a robotic wheel gripper unit above a wheel such that a gripper tool, which comprises a plurality of gripper fingers and at least one sensor configured to detect a location of a tire pressure monitor system valve stem on a wheel, is positioned above the wheel;
   lowering the gripper tool into a scanning position so as to dispose the gripper fingers about an outer periphery of the wheel and to position the sensor between a top and a bottom surface of the wheel;
   rotating the gripper tool about the wheel until the sensor detects the location of the tire pressure monitor system valve stem;
   recording the location of the tire pressure monitor system valve stem relative to a fixed reference point;
   moving the gripper tool into a gripping configuration, wherein the gripper fingers engage a portion of the wheel;
   rotating the wheel to position the tire pressure monitor system valve stem at a predetermined location; and
   releasing the wheel by moving the gripping tool into a releasing configuration, whereby the gripping fingers are no longer in contact with the wheel.

2. The method of claim 1, further comprising raising the gripper tool from the scanning position before moving the gripper fingers into engagement with the wheel.

3. The method of claim 1, wherein the gripper fingers engage a top peripheral edge of the wheel.

4. The method of claim 1, wherein moving the gripper fingers into the gripping configuration further comprises moving the gripping fingers laterally toward one another.

5. The method of claim 1, wherein after rotating the wheel to orient the tire pressure monitor system valve stem, the robotic wheel gripper unit positions the wheel on an assembly conveyor before releasing the wheel.

6. The method of claim 5, further comprising positioning a tire on the wheel after the wheel is positioned on the assembly conveyor.

7. The method of claim 6, inflating the tire after the tire is fully seated on the wheel.

8. A robotic wheel gripper unit configured for gripping and transporting a wheel to a predetermined position, comprising:
   a selectively moveable arm; and
   a gripper tool that is connected to a first end of the moveable arm;
   wherein the gripper tool further includes a plurality of gripper fingers carried on platforms and configured for selectively engaging a portion of a wheel; and wherein the gripper tool further comprises at least one sensor mounted to at least one of the platforms and configured to detect a location of a predetermined element on the wheel indicating to the moveable arm a rotation of the gripper tool about the wheel until the sensor detects the location of the predetermined element on the wheel.

9. The robotic wheel gripper unit of claim 8, wherein the gripper fingers are selectively moveable from a releasing position to a gripping position, wherein in the releasing position, the gripper fingers are moved laterally away from the wheel.

10. The robotic wheel gripper unit of claim 9, wherein the gripper fingers further comprise gripper grooves that are configured to engage with the portion of the wheel when the gripper fingers are in the gripping position.

11. The robotic wheel gripper unit of claim 9, where the gripper tool includes two pairs of gripper fingers, with each pair being carried on a common platform.

12. The robotic wheel gripper unit of claim 8, wherein the sensor is mounted to a sensor plate that extends from one of the platforms.

13. The robotic wheel gripper unit of claim 8, wherein the sensor is an optical sensor.

14. The robotic wheel gripper unit of claim 8, wherein the sensor is configured to locate a tire pressure monitor system valve stem on the wheel.

15. The robotic wheel gripper unit of claim 9, wherein the sensor is operatively connected to a controller that records the position of the tire pressure monitor system valve stem with respect to a fixed position such that the gripper tool may position the wheel on an assembly conveyor in a predetermined position to locate the predetermined element at a predetermined orientation during an assembly operation with a tire.

16. The robotic wheel gripper unit of claim 8, wherein the moveable arm is operatively connected at a second end thereof to a body portion, wherein the body portion is rotatably-connected to a base portion such that the base portion may be pivoted relative to the base portion.

17. A robotic wheel gripper unit configured for gripping and transporting a wheel to a predetermined position, comprising:
   a selectively moveable arm; and
   a gripper tool being connected to a first end of the moveable arm and including a plurality of gripper fingers and at least one sensor, the at least one sensor configured to detect a location of a tire pressure monitor system valve stem on the wheel, and wherein the gripper tool is configured to
   position above a wheel and receive the location of the tire pressure monitor system valve stem on a wheel from the at least one sensor,
   lower into a scanning position so as to dispose the gripper fingers about an outer periphery of the wheel and to position the sensor between a top and a bottom surface of the wheel;
   rotate about the wheel until the sensor detects the location of the tire pressure monitor system valve stem;
   record the location of the tire pressure monitor system valve stem relative to a fixed reference point;
   move the gripper tool into a gripping configuration, wherein the gripper fingers engage a portion of the wheel;
   rotate the wheel to position the tire pressure monitor system valve stem at a predetermined location; and
   release the wheel whereby the gripping fingers are no longer in contact with the wheel.

18. The gripper of claim 17, wherein the gripper fingers engage a top peripheral edge of the wheel.

19. The method of claim 1, wherein the gripping fingers laterally toward and away from one another.

\* \* \* \* \*